United States Patent
Hardy et al.

(10) Patent No.: US 10,069,580 B2
(45) Date of Patent: Sep. 4, 2018

(54) WIRELESS RADIO DEVICE ALIGNMENT TOOLS AND METHODS

(71) Applicant: Ubiquiti Networks, Inc., New York, NY (US)

(72) Inventors: Matthew A. Hardy, Atlanta, GA (US); Robert J. Pera, San Jose, CA (US)

(73) Assignee: Ubiquiti Networks, Inc., New York, NY (US)

( * ) Notice: Subject to any disclaimer, the term of this patent is extended or adjusted under 35 U.S.C. 154(b) by 0 days.

(21) Appl. No.: 14/754,084

(22) Filed: Jun. 29, 2015

(65) Prior Publication Data

US 2015/0381293 A1      Dec. 31, 2015

Related U.S. Application Data (60) Provisional application No. 62/019,329, filed on Jun. 30, 2014.

(51) Int. Cl.
| | |
|---|---|
| *H04B 17/00* | (2015.01) |
| *H04B 17/318* | (2015.01) |
| *H04W 4/02* | (2018.01) |
| *H04W 56/00* | (2009.01) |
| *H01Q 1/12* | (2006.01) |

(52) U.S. Cl.
CPC ........... *H04B 17/318* (2015.01); *H01Q 1/125* (2013.01); *H04W 4/026* (2013.01); *H04W 56/0015* (2013.01)

(58) Field of Classification Search
CPC .. H04W 24/02; H04W 4/026; H04W 56/0015
USPC ...................................................... 455/67.7
See application file for complete search history.

(56) References Cited

U.S. PATENT DOCUMENTS

| | | |
|---|---|---|
| 2,455,888 A | 12/1948 | Brown |
| 3,599,219 A | 8/1971 | Holtum et al. |
| 3,739,392 A | 6/1973 | Ross et al. |
| 4,578,638 A | 3/1986 | Takano et al. |
| 4,626,863 A | 12/1986 | Knop et al. |
| 4,788,554 A | 11/1988 | Smith |
| 4,918,459 A | 4/1990 | De Teso |
| 5,010,348 A | 4/1991 | Rene et al. |
| 5,131,006 A | 7/1992 | Kamerman et al. |
| 5,151,920 A | 9/1992 | Haagh et al. |
| 5,295,154 A | 3/1994 | Meier et al. |
| 5,374,911 A | 12/1994 | Kich et al. |
| 5,402,136 A | 3/1995 | Goto et al. |
| 5,406,260 A | 4/1995 | Cummings et al. |
| 5,422,887 A | 6/1995 | Diepstraten et al. |
| 5,428,636 A | 6/1995 | Meier |
| 5,446,792 A | 8/1995 | Sango |

(Continued)

FOREIGN PATENT DOCUMENTS

| | | |
|---|---|---|
| CN | 202042599 U | 11/2011 |
| EP | 2416449 A1 | 2/2012 |

(Continued)

OTHER PUBLICATIONS

Sanford, John; U.S. Appl. No. 14/170,507 entitled "Coaxial RF Dual-Polarized Waveguide Filter and Method," filed Jan. 31, 2014.

(Continued)

*Primary Examiner* — Eugene Yun
(74) *Attorney, Agent, or Firm* — Shay Glenn LLP (57) ABSTRACT

Wireless radio device alignment tools and methods. Described herein are methods for point-to-point alignment of wireless radio devices and alignment tools to assist in aligning wireless radio devices. These alignment tools may automatically or manually receive location information and may use a local compass function to determine a rough or initial alignment and additional tools to provide further (fine) alignment based on calculated and actual signal strength between the two devices being aligned.

20 Claims, 7 Drawing Sheets

(56) References Cited

U.S. PATENT DOCUMENTS

| | | |
|---|---|---|
| 5,504,746 A | 4/1996 | Meier |
| 5,546,397 A | 8/1996 | Mahany |
| 5,625,365 A | 4/1997 | Tom et al. |
| 5,706,428 A | 1/1998 | Boer et al. |
| 5,740,366 A | 4/1998 | Mahany et al. |
| 5,760,739 A | 6/1998 | Pauli |
| 5,760,749 A | 6/1998 | Minowa et al. |
| 5,844,893 A | 12/1998 | Gollnick et al. |
| 5,907,310 A | 5/1999 | Seewig et al. |
| 5,936,542 A | 8/1999 | Kleinrock et al. |
| 5,940,771 A | 8/1999 | Gollnick et al. |
| 5,943,430 A | 8/1999 | Salton |
| 6,130,892 A | 10/2000 | Short et al. |
| 6,137,449 A | 10/2000 | Kildal |
| 6,169,522 B1 | 1/2001 | Ma et al. |
| 6,184,840 B1 | 2/2001 | Hsin-Loug et al. |
| 6,194,992 B1 | 2/2001 | Short et al. |
| 6,337,990 B1 | 1/2002 | Koshino |
| 6,374,311 B1 | 4/2002 | Mahany et al. |
| 6,437,757 B1 | 8/2002 | Butler |
| 6,563,786 B1 | 5/2003 | Nee |
| 6,636,894 B1 | 10/2003 | Short et al. |
| 6,665,536 B1 | 12/2003 | Mahany |
| 6,697,415 B1 | 2/2004 | Mahany |
| 6,714,559 B1 | 3/2004 | Meier |
| 6,789,110 B1 | 9/2004 | Short et al. |
| 6,795,852 B1 | 9/2004 | Kleinrock et al. |
| 6,810,426 B2 | 10/2004 | Mysore et al. |
| 6,857,009 B1 | 2/2005 | Ferreria et al. |
| 6,868,399 B1 | 3/2005 | Short et al. |
| 6,970,680 B1 | 11/2005 | Tomoe |
| 7,020,082 B2 | 3/2006 | Bhagavath et al. |
| 7,088,727 B1 | 8/2006 | Short et al. |
| 7,117,526 B1 | 10/2006 | Short |
| 7,155,196 B1 | 12/2006 | Beard |
| 7,194,554 B1 | 3/2007 | Short et al. |
| 7,197,556 B1 | 3/2007 | Short et al. |
| 7,254,191 B2 | 8/2007 | Sugar et al. |
| 7,295,812 B2 | 11/2007 | Haapoja et al. |
| 7,386,002 B2 | 6/2008 | Meier |
| 7,457,646 B2 | 11/2008 | Mahany et al. |
| 7,656,363 B2 | 2/2010 | Devicque et al. |
| 7,715,800 B2 | 5/2010 | Sinha |
| 7,739,383 B1 | 6/2010 | Short et al. |
| 7,752,334 B2 | 7/2010 | Paunikar et al. |
| 7,826,426 B1 | 11/2010 | Bharghavan et al. |
| 8,077,113 B2 | 12/2011 | Syed et al. |
| 8,190,708 B1 | 5/2012 | Short et al. |
| 8,335,272 B2 | 12/2012 | Roberts |
| 8,385,869 B2 | 2/2013 | Feenaghty et al. |
| 8,466,847 B2 | 6/2013 | Pera et al. |
| 8,483,188 B2 | 7/2013 | Walton et al. |
| 8,493,279 B2 | 7/2013 | Pera et al. |
| 8,581,795 B2 | 11/2013 | Simms et al. |
| 8,804,622 B1 | 8/2014 | Thai et al. |
| 8,836,601 B2 | 9/2014 | Sanford et al. |
| 9,191,037 B2 | 11/2015 | Lascari et al. |
| 2002/0044032 A1 | 4/2002 | Guguen et al. |
| 2002/0098805 A1 | 7/2002 | King |
| 2003/0032398 A1 | 2/2003 | Harris |
| 2003/0038753 A1 | 2/2003 | Mahon |
| 2003/0203743 A1 | 10/2003 | Sugar et al. |
| 2003/0207669 A1 | 11/2003 | Kroeger |
| 2003/0221304 A1 | 12/2003 | Janssen et al. |
| 2003/0224801 A1 | 12/2003 | Lovberg et al. |
| 2004/0071298 A1 | 4/2004 | Geeng |
| 2004/0108966 A1 | 6/2004 | McKivergan et al. |
| 2005/0245254 A1 | 11/2005 | Hall |
| 2006/0001589 A1 | 1/2006 | Nicolae |
| 2006/0007044 A1 | 1/2006 | Crouch et al. |
| 2006/0009177 A1 | 1/2006 | Persico et al. |
| 2007/0057860 A1 | 3/2007 | Jaffer et al. |
| 2007/0132651 A1 | 6/2007 | Nilsson |
| 2007/0157482 A1 | 7/2007 | Wallace |
| 2008/0199037 A1 | 8/2008 | Xu et al. |
| 2008/0224938 A1 | 9/2008 | Udagawa et al. |
| 2008/0240313 A1 | 10/2008 | Deisher et al. |
| 2008/0261548 A1 | 10/2008 | Krone |
| 2008/0297425 A1 | 12/2008 | Axton et al. |
| 2009/0174622 A1 | 7/2009 | Kanou |
| 2009/0310721 A1 | 12/2009 | Redfern et al. |
| 2010/0013729 A1 | 1/2010 | Harel et al. |
| 2010/0053022 A1 | 3/2010 | Mak et al. |
| 2010/0245187 A1 | 9/2010 | Omuro et al. |
| 2010/0285769 A1 | 11/2010 | Conroy et al. |
| 2010/0289705 A1 | 11/2010 | Shtrom et al. |
| 2011/0012801 A1 | 1/2011 | Monte et al. |
| 2011/0068988 A1 | 3/2011 | Monte |
| 2011/0168480 A1 | 7/2011 | Sterling et al. |
| 2011/0181479 A1 | 7/2011 | Martin et al. |
| 2011/0258678 A1 | 10/2011 | Cowling et al. |
| 2012/0013516 A1 | 1/2012 | Ahn et al. |
| 2012/0176608 A1 | 7/2012 | McCown |
| 2012/0213086 A1 | 8/2012 | Matsuura |
| 2012/0250793 A1 | 10/2012 | Khatana et al. |
| 2013/0002515 A1 | 1/2013 | Hills et al. |
| 2013/0012134 A1 | 1/2013 | Jin et al. |
| 2013/0017794 A1 | 1/2013 | Kloper et al. |
| 2013/0028150 A1 | 1/2013 | Ma et al. |
| 2013/0135146 A1 | 5/2013 | Ransom et al. |
| 2013/0154894 A1 | 6/2013 | Caimi et al. |
| 2013/0163770 A1 | 6/2013 | Takemura |
| 2013/0249754 A1 | 9/2013 | Rice |
| 2014/0118220 A1 | 5/2014 | Ley |
| 2014/0218248 A1 | 8/2014 | Schulz et al. |
| 2014/0219142 A1 | 8/2014 | Schulz et al. |
| 2014/0220903 A1 | 8/2014 | Schulz et al. |
| 2014/0274177 A1 | 9/2014 | Carbajal |
| 2014/0315599 A1* | 10/2014 | Teichmann ........ H04N 5/23229 455/556.1 |
| 2015/0002357 A1 | 1/2015 | Sanford et al. |
| 2015/0280328 A1 | 10/2015 | Sanford et al. |
| 2015/0280329 A1 | 10/2015 | Sanford et al. |
| 2015/0292948 A1 | 10/2015 | Goldring et al. |
| 2016/0104941 A1 | 4/2016 | Lee et al. |
| 2016/0112074 A1 | 4/2016 | Lascari et al. |

FOREIGN PATENT DOCUMENTS

| | | |
|---|---|---|
| JP | S54-95157 U | 7/1979 |
| JP | 2002299940 A | 10/2002 |
| JP | 2007259001 | 10/2007 |
| JP | 2010192992 A | 9/2010 |
| JP | 2012227863 A | 11/2012 |
| KR | 10-2008-0079357 | 9/2008 |
| KR | 20-0450128 Y1 | 8/2010 |
| KR | 10-1023789 B1 | 3/2011 |
| KR | 10-1068766 B1 | 9/2011 |
| WO | WO98/40990 A1 | 9/1998 |
| WO | WO01/31855 A2 | 5/2001 |
| WO | WO01/31886 A2 | 5/2001 |
| WO | WO01/86877 A2 | 11/2001 |
| WO | WO2008/042804 A2 | 4/2008 |
| WO | WO2008/154514 A2 | 12/2008 |
| WO | WO2009/131219 A1 | 10/2009 |
| WO | WO2011/005710 A2 | 1/2011 |

OTHER PUBLICATIONS

Le-Ngoc et al.; Design aspects and performance evaluation of ATCS mobile data link; IEEE 39th; InVehicular Technology Conference; pp. 860-867; May 1, 1989.

* cited by examiner

WIRELESS RADIO DEVICE ALIGNMENT TOOLS AND METHODS

CROSS REFERENCE TO RELATED APPLICATIONS

This patent claims priority to U.S. Provisional Patent Application No. 62/019,329, filed on Jun. 30, 2014 (titled "WIRELESS RADIO DEVICE ALIGNMENT TOOLS AND METHODS") which is herein incorporated by reference in its entirety.

INCORPORATION BY REFERENCE

All publications and patent applications mentioned in this specification are herein incorporated by reference in their entirety to the same extent as if each individual publication or patent application was specifically and individually indicated to be incorporated by reference.

FIELD

Described herein are wireless communications systems and methods, including broadband wireless radios such as IEEE 802.11 radios and methods and tools for aligning them.

BACKGROUND

Wireless communication devices and wireless networks have proliferated in recent years. This has resulted in region having different electromagnetic spectrum profiles. For example, in some regions geographic as well as population conditions have resulted in relatively crowded local frequency spectra. Although both regulatory agencies (such as the FCC in the United States) and manufacturers have attempted to regulate and minimize such crowding, it has proven difficult to optimize and prevent interference across commercially relevant portions of the electromagnetic spectrum. In particular, electromagnetic interference, from both natural and man-made sources, is difficult to predict and to avoid. Unfortunately, electromagnetic interference causes significant problems for wireless devices and networks. Electromagnetic interference can arise from other communication devices even if those other devices use a different carrier frequency. For example, a cordless telephone using a first carrier frequency could generate electromagnetic interference that makes it difficult for a communication device using a second carrier frequency to maintain connection to a local area network (LAN). Electromagnetic interference might also arise from electronic devices other than communication devices (e.g., microwave ovens, etc.).

Determining the source of interference and/or preventing or avoiding it has proven difficult. Since electromagnetic interference can be highly local, and interference in the electromagnetic spectrum seen by some devices may not be seen by other devices even in the same network, it would be helpful to be able to monitor local interference at a wireless radio device, including at both ends of link in a network, such as at an access point (AP) and at an end device (e.g. a customer provided equipment, or CPE). In addition, since electromagnetic "traffic" and interference may vary greatly over time, it would be helpful to monitor continuously.

Further, the alignment of wireless radio devices, and particularly devices that are configured for directed (e.g., point-to-point) transmission may be of particular importance in enhancing the operation of these devices and of networks including them. Traditional alignment of a local wireless radio device (e.g., antenna) with another wireless radio device is a slow, and iterative process that is particular labor intensive when the two devices are separated by a substantial distance. Thus, it would be beneficial to provide devices and method (including alignment tools) for aligning such wireless radio devices.

SUMMARY OF THE DISCLOSURE

Described herein are wireless radio apparatuses (devices and systems), and method and apparatus (including tools) for aligning them. In particular, described herein are methods and apparatuses (e.g., tools) for point-to-point alignment of wireless radio devices.

Any of the wireless radio devices described herein may be wireless devices that include integrated spectrum analyzers. For example, described herein are devices and systems that include a first wireless radio receiver and transmitter (or transceiver) that operates in parallel with a second receiver; the second receiver may be configured as a spectrum analyzer, and continuously scans the operating band. Thus, in any of the devices described herein, the spectrum analyzer portion and the first receiver may be operated concurrently and independently of each other. Information on the spectrum that comes from monitoring the operating band may be stored, analyzed and/or transmitted by a processor that is associated with the spectrum analyzer, referred to herein as a spectrum processor. The spectrum information may be encrypted and may be transmitted to one or more remote processors (including servers) using the transmitter (Tx) that is used for normal operation of the wireless radio, or the spectrum analyzer may include a dedicated transmitter (or transceiver).

For example, described herein are wireless radio devices that are configured to wirelessly receive and transmit radio frequency signals in an operating band and have an integrated spectrum analyzer. The spectrum analyzer may be configured to operate continuously or continuously or constantly. For example, the spectrum analyzer may be adapted to constantly scan an operating band, and after one or more (predetermined) scan, may pause before starting the next scan or sets of scans. For example, a wireless radio device configured to wirelessly receive and transmit radio frequency signals in an operating band having an integrated spectrum analyzer may include: an antenna (e.g., a receive antenna); a first receiver coupled to the antenna by a first receiving path for receiving a radio frequency signal within the operating band from the antenna; a spectrum analyzer operating in parallel with the first receiving path, wherein the spectrum analyzer is configured to continuously scan through the operating band and collect spectrum information on the operating band concurrent with the first receiver receiving the radio frequency signal; and a spectrum processor coupled to the spectrum analyzer and configured to wirelessly transmit the spectrum information to a remote spectrum analysis unit.

The antenna may be for both receiving and transmission, or it may be a dedicated receive antenna. Although the primary receiver (or transceiver) may operate with the same antenna (and in parallel) as the receiver adapted to operate as the spectrum analyzers, the spectrum analyzer may use a separate (e.g., dedicated) antenna.

The general-purpose receiver of the device or system typically receives radio frequency signals within an operating band, as described in greater detail below, may operate in one or more channels and may be switches between channels within the operating band. The spectrum analyzer typically scans through all of the channels of the operating band. In some variations, the spectrum analyzer may scan though a band that is larger than the operating band, for example, bracketing the operating band on one or both sides of the spectrum.

A wireless radio device configured to wirelessly receive and transmit radio frequency signals in an operating band may include: an antenna; a first receiver coupled to the antenna by a first receiving path for receiving a radio frequency signal from the antenna; a second receiving path in parallel with the first receiving path, the second receiving path coupled to the antenna and connected to a spectrum analyzer, wherein the spectrum analyzer is configured to continuously scan the operating band while the first receiver receives the radio frequency signal and to record spectrum information on the operating band; and a spectrum processor coupled to the spectrum analyzer and configured to encode the spectrum information for transmission to a remote spectrum analysis unit.

Described herein are method and tools (devices and systems) for aligning wireless radio devices. For example, described herein are methods for point-to-point alignment of wireless radio devices. Any of these methods may use an alignment tool, and in particular, and alignment tool having a compass which may be one or more sensors that can be operated as a compass (e.g. providing direction relative to north, south, etc.). For example, a method may comprise: determining a location of a first wireless radio device that is remotely located relative to the alignment tool; determining a location of a second wireless radio device that is local to the alignment tool; using the compass of the alignment tool and the locations of the first and second wireless radio devices to determine a direction to point the second wireless radio device; and displaying, with the alignment tool, an indicator of the direction.

For example, a method for point-to-point alignment of wireless radio devices using an alignment tool having a compass may include: entering an identity of a first wireless radio device into the alignment tool, wherein the first wireless radio device is remotely located relative to the alignment tool; determining a location of the first wireless radio device; determining a location of a second wireless radio device that is local to the alignment tool; calculating a direction of the first wireless radio device relative to the second wireless radio device; using the compass of the alignment tool to determine a direction to point the second wireless radio device so that the second wireless device is oriented towards the first wireless radio device; and displaying, with the alignment tool, an indicator of the direction to point the second wireless radio device.

The step of determining the location of the first wireless radio device may include entering the identity of the first wireless radio device into the alignment tool. Determining the location of the first wireless radio device may comprises entering the identity of the first wireless radio device into the alignment tool and receiving GPS information indicating the location of the first wireless radio device.

In general, calculating the direction of the first wireless radio device relative to the second wireless radio device may comprise calculating the direction of the first wireless radio device relative to the second wireless radio device in the alignment tool. This calculation may be performed using the GPS information, as mentioned. Calculating the direction of the first wireless radio device relative to the second wireless radio device may comprise calculating the direction of the first wireless radio device relative to the second wireless radio device in a remote processor and transmitting the direction to the alignment tool.

Determining the location of the first wireless radio device may comprise wirelessly receiving, in the alignment tool, a GPS indication of the location of the first wireless radio device, either automatically or manually. Determining the location of the second wireless radio device may comprise determining the location of the alignment tool. Determining the location of the second wireless radio device may comprise receiving a GPS indication of the location of the second wireless radio device, either manually or automatically.

The method may also include finely tuning the direction of the second radio device. For example, the method may include displaying with the alignment tool, an indicator of the measured signal strength between the first and second radio devices. In addition, the method may include calculating an estimate of optimal signal strength between the first and second wireless radio devices and displaying on the alignment tool an indicator of the optimal signal strength between the first and second wireless radio devices. The actual and calculated signal strengths (ideal signal strength) may be used as a guide to drive fine tuning of the alignment. This fine tuning may be performed manually or automatically. For example, the method may include calculating an estimate of optimal signal strength between the first and second wireless radio devices and displaying on the alignment tool an indicator of how optimal the signal strength between the first and second wireless radio devices is.

The method may also include activating the alignment tool, wherein the alignment tool comprises a smartphone executing application software, as described herein. Alternatively or additionally, the alignment tool may be a module attached to the second wireless radio device. For example the alignment tool may be built into a wireless radio device for aligning it, or it may be adapted to dock onto/couple with the wireless radio device.

Also described herein are alignment tools. For example, an alignment tool to assist in aligning a first wireless radio device and a second wireless radio device may be configured as a non-transitory computer-readable storage medium storing a set of instructions capable of being executed by a processor, wherein the set of instructions, when executed by the processor, causes the processor to: determine a location of the first wireless radio device; determine a location of the second wireless radio device; calculate a direction of the first wireless radio device relative to the second wireless radio device; use a compass to determine a direction to point the second wireless radio device so that the second wireless device is oriented towards the first wireless radio device; and cause an indicator of the direction to point the second wireless radio device to be displayed.

For example, an alignment tool to assist in aligning a first wireless radio device and a second wireless radio device, may comprise a non-transitory computer-readable storage medium storing a set of instructions capable of being executed by a processor, wherein the set of instructions, when executed by the processor, causes the processor to: determine a location of the first wireless radio device; determine a location of the second wireless radio device; calculate a direction of the first wireless radio device relative to the second wireless radio device; use a compass to determine a direction to point the second wireless radio device so that the second wireless device is oriented towards the first wireless radio device; cause an indicator of the direction to point the second wireless radio device to be displayed; and cause an indicator of the signal strength between the first and second wireless radio devices to be displayed.

The set of instructions, when executed by the processor, may further cause the processor to: calculate an estimate of optimal signal strength between the first and second wireless radio devices; and cause an indicator of the optimal signal strength between the first and second wireless radio devices to be displayed. In some variations, the set of instructions, when executed by the processor, further causes the processor to: calculate an estimate of optimal signal strength between the first and second wireless radio devices; and cause an indicator of how optimal the signal strength between the first and second wireless radio devices is to be displayed.

In some examples the alignment tool is an app that runs on a handheld device (e.g. table, smartphone, laptop, etc.) which may include a display screen and one or more sensors that can provide directional information (e.g., compass, etc.). Thus, the processor may comprise a processor of a smartphone.

The alignment tool may determine the location of the local and remote wireless devices either manually (by having a user input or select from a menu of local/remote devices and/or their locations and/or their operating characteristics, make/model, etc.) or automatically, or semi-automatically (e.g., requiring confirmation by the user of automatically detected information).

For example, the set of instructions, when executed by the processor, may further cause the processor to: receive the identity of the first wireless radio device into the alignment tool. The set of instructions, when executed by the processor, may further cause the processor to: receive the identity of the second wireless radio device into the alignment tool.

In some variations, the set of instructions, when executed by the processor, further causes the processor to: receive GPS information indicating the location of the first wireless radio device. The set of instructions, when executed by the processor, may further cause the processor to: receive GPS information indicating the location of the second wireless radio device.

The set of instructions, when executed by the processor, may further cause the processor to: determine the location of the second wireless radio device from the location of the alignment tool. The set of instructions, when executed by the processor, may further cause the processor to: cause an indicator of the measured signal strength between the first and second radio devices to be displayed by the alignment tool.

Although the examples of alignment tools described above are configured as applications (e.g. software) that can be run on a general-purpose processor, dedicated alignment tools may also be used, and may incorporate any of the elements described herein for the alignment tools, including a directional sensor (e.g., compass) and processor.

BRIEF DESCRIPTION OF THE DRAWINGS

In FIGS. 5A and 5B the alignment tool causes the display (e.g., display of a smartphone) to show a direction indicator for alignment (arrow), a target signal level between the local and remote devices and the current (actual) signal level(s) between the local and remote devices.

DETAILED DESCRIPTION

In general, described herein are alignment tools for aligning a first wireless radio device and a second wireless radio device. The alignment tool may include a handheld device that may be held or attached to an antenna (including attached in a defined orientation relative to the antenna to which it is attached). The alignment tool may be a dedicated tool (e.g., having a housing, internal circuitry (e.g., processor, memory, GPS, WiFi and/or other radio circuitry), a display, etc., or it may be control logic operating on a portable computing device, such as a smartphone, or wearable computing device. Alternatively or additionally, the alignment tool may be integrated into the antenna.

For example, and alignment tool may include alignment logic, such as a non-transitory computer-readable storage medium storing a set of instructions capable of being executed by a processor, wherein the set of instructions, when executed by the processor, causes the processor to: determine a location of the first wireless radio device; determine a location of the second wireless radio device; calculate a direction of the first wireless radio device relative to the second wireless radio device; use a compass to determine a direction to point the second wireless radio device so that the second wireless device is oriented towards the first wireless radio device; and cause an indicator of the direction to point the second wireless radio device to be displayed.

These alignment tools may be used with any appropriate radio frequency (RF) antenna apparatus, including but not limited to those specifically and generically described herein. For example, a wireless radio apparatuses may include a first (primary) receiver and a second (secondary) receiver that are connected in parallel, for example, to the same receiving antenna. The primary receiver may be a high-selectivity receiver, and may be configured to receiver radio-frequency signals within an operating frequency band. The second receiver may be configured as a spectrum analyzer, that analyzes all or a portion (e.g., at predetermined frequency locations) of the operating band. The secondary receiver typically operates simultaneously with the first receiver, and may operate continuously or periodically (e.g., at regular intervals) to scan the operating band or predetermined portions of the operating band. The second receiver may be controlled by a secondary processor, which may be configured as a spectrum processor for controlling operation of the secondary receiver as a spectrum analyzer.

Figure 1A:
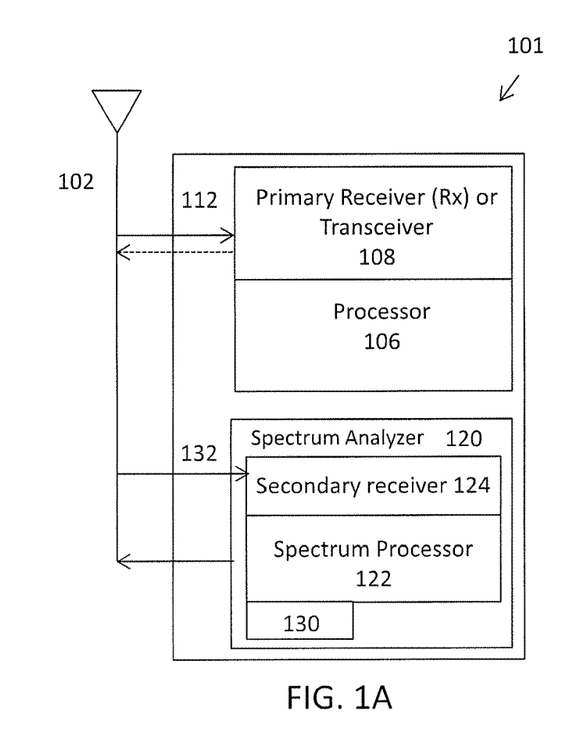
FIG. 1A schematically illustrates one example of a device having an integrated spectrum analyzer for independently and continuously monitoring the operating band.
Figure 1B:
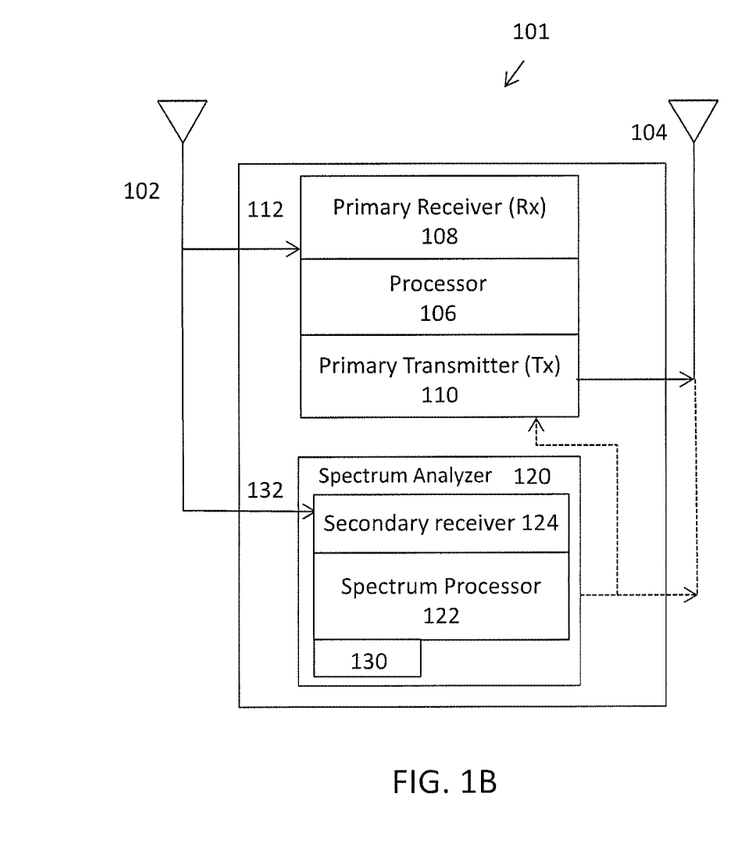
FIG. 1B schematically illustrates another example of a device having an integrated spectrum analyzer for independently and continuously monitoring the operating band.

For example, FIGS. 1A and 1B schematically illustrate two generic variations of RF antenna devices that include a primary receiver (or a receiver portion of a transmitter) that is used to receive wireless data and operates at one or more frequency channels within an operating band; these devices also include a secondary receiver that, in conjunction with a secondary processor, simultaneously scans the frequency spectrum of the operating band.

In FIG. 1A, the device 101 includes an antenna 102 to which a primary receiver 108 is connected via a receiving path (line 112). The primary receiver 108 is connected to (and may be controlled by) a primary processor 106 or controller. In some variations the receiver is part of a transceiver. In some variations (not shown) a separate transmitter may be connected to the processor 106 and/or the antenna 102. This 'primary' pathway may operate to wirelessly communicate with one or more other devices and typically transmits and receives radio-frequency information using one or more channels that are part of an operating frequency band. In this example, a secondary receiver 120 is connected in parallel with the primary receiver 108 to the same antenna 102 which is also connected to a secondary processor 122. In some variations a separate antenna may be used. In FIG. 1A, the secondary receiver 124 is configured as a spectrum analyzer 120, and the secondary processor 122 is configured as a spectrum processor 122. The spectrum processor can control the spectrum analyzer 120 and process spectrum information about the frequency band (or specific, predetermined sub-portions of the frequency band). In particular, the spectrum analyzers (e.g., the spectrum processor portion of the spectrum analyzer may store (e.g., in a memory 130), analyze, encode, and/or transmit the spectrum information.

For example, a spectrum processor may cause the secondary receiver to scan through the operating band (frequency band) collecting frequency spectrum information, including process frequency. In FIG. 1A the spectrum information (encoded or otherwise) may e In use, there are many functions that may be performed by apparatuses including a primary receiver and a secondary receiver adapted to analyze the local frequency spectrum of the apparatus. In some examples, such an apparatus may be used for simultaneously communicating wirelessly (e.g., via the primary receiver, a primary transmitter and/or a primary transceiver) and monitoring the local frequency spectrum over the operating band. The frequency information may be collected, analyzed, stored and/or transmitted. Spectrum information (data) from the spectrum analyzer may be processed by filtering or the like. A spectrum analyzer my process signals continuously, e.g., without consideration of protocol preambles or data coding as would be used in the primary receiver. Thus packet detection is not required. Frequency domain information may describe power versus frequency for the real and imaginary component.

Spectrum information may be encoded with additional information such one or more of: temporal information (date/time the frequency information was collected), location/position information (e.g., GPS information locating the device geographically), orientation information (e.g., direction orientation), device-identifying information (unique identifiers for a particular device, information about the make/model of the device, lot number, etc.), or the like.

Any of the frequency information (including encoded information) may be stored and/or transmitted. For example, in FIG. 1A, the spectrum analyzer is shown connected to the antenna so that it can be transmitted.

FIG. 1B is another example of a device including a spectrum analyzer 120 connected in parallel to a primary receiver 108. In this example, the primary receiver is also connected to a processor 106 along with a primary transmitter. A second antenna 104 is used to transmit, while a receiving antenna 102 is used for receiving wireless radio-frequency information. In FIG. 1B, the same device may be transmitting and receiving simultaneously, and at the same time monitoring (using the spectrum analyzer 120) the frequency spectrum of the operating band.

In both FIG. 1A and FIG. 1B, the spectrum analyzers may wirelessly transmit spectrum information (encoded or not). The spectrum information may be transmitted by primary transmitter and/or directly by the antenna (e.g., in FIG. 1B, the transmission antenna), as indicated by the dashed lines in FIG. 1B.

As mentioned above, described herein are radio devices that include at least two sets of radio receivers, where the first (primary) one of the receivers may be configured to act as a wireless radio for receiving data and the second receiver may be adapted to do persistent spectrum analysis of the band that the first receiver is operating in. In some variations, the device may modify the first receiver based on information from spectrum analysis. In some variations, the device does not modify the first receiver based on information from the spectrum analysis. The device may be adapted to transmit information about the local radio frequency (RF) environment from the spectrum analyzer and report this information to an aggregator (e.g., a remote processor/server) that can combine this information with other frequency spectrum information from other locations (or overlapping locations). This collected information may be used to optimize the network frequency channel planning, for example.

Figure 1C:
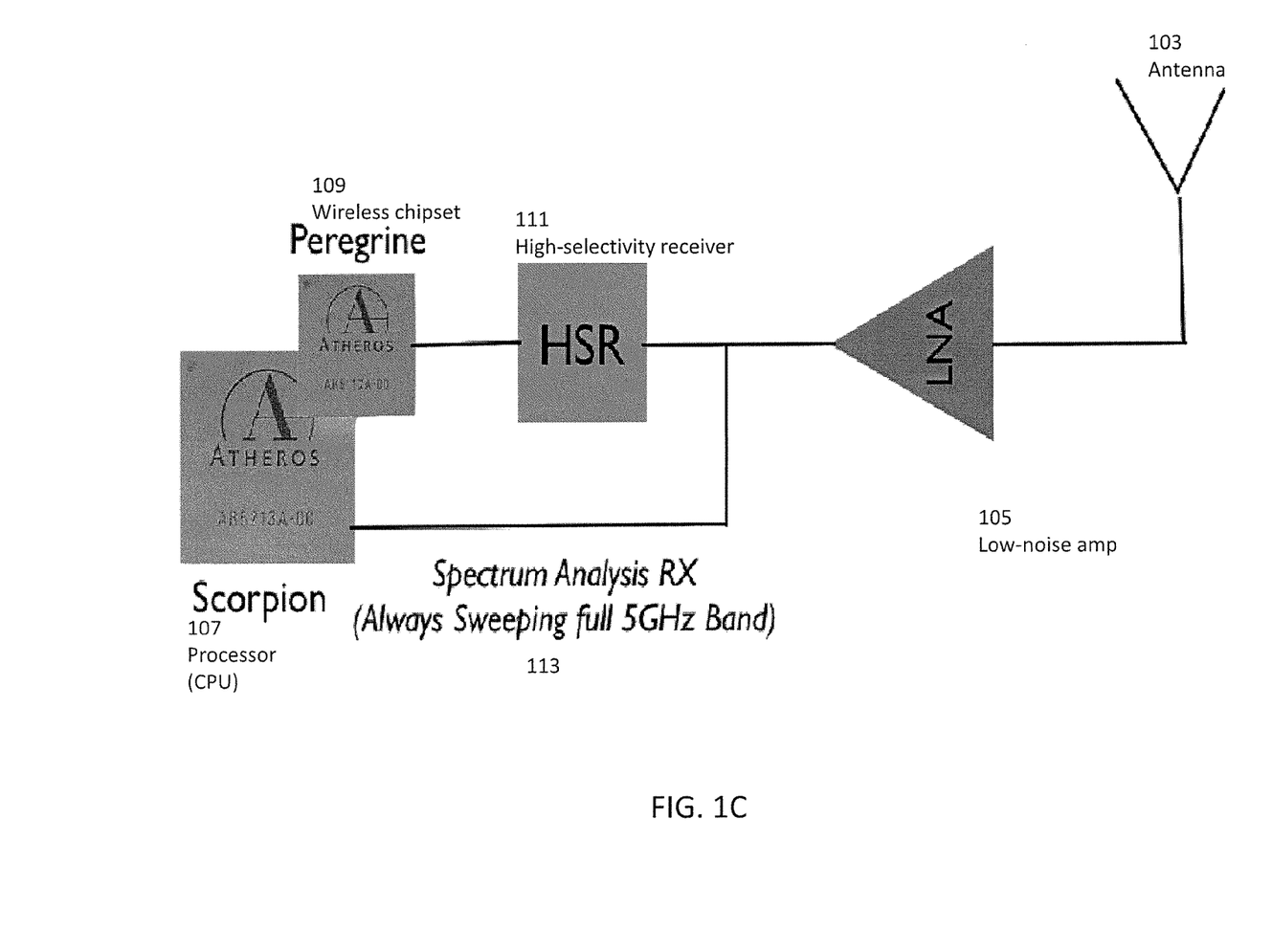
FIG. 1C is a schematic illustration of a wireless radio device including a persistent spectrum analyzer operating in parallel with a high-selectivity receiver.

Thus, described herein are apparatuses and methods that use a secondary receiver set, which may be independent of the first receiver set and may be connected to the same receiving antenna or may have a separate antenna, and is configured as a spectrum analyzer. In the example, shown in FIG. 1, a radio device that is configured as an 802.11 device operating in the 5 GHz band and includes pair of receivers 111, 113. One of the receivers is adapted as a spectrum analysis receiver that is continuously sweeping the full 5 GHz band. In FIG. 1, both receivers are connected to the same front-end, including an antenna adapted to receive in the 5 GHz band 103 and pre-filtering, such as a low-noise amplifier 105. The first receiver 111 is a high-selectivity receiver (HSR) for processing data within the 5 GHz band. In parallel with the high-selectivity receiver 111, a second receiver 113 operates as a spectrum analyzer to monitor the 5 GHz band used by the first receiver 111. A wireless chipset 109 and processor 107 may be used by either or both receivers. For example, an 802.11(n) 5 GHz radio may be used as a spectrum analyzer along with another (data) receiver (primary receiver 111) as part of an 802.6Ac radio. The 802.11(n) receiver may perform persistent spectrum analysis in the background as the other receiver receives data.

The spectrum information may be used to modify or adjust the operation of a network that includes one or more of the devices described above. In particular, similar devices may all report back to a processor (aggregator) that can monitor the overall RF environment status of a network or of multiple networks. This information may be used, for example, to optimize network, by optimizing frequency channel planning or other means, or for optimizing the positioning or operation of individual devices within the network.

As mentioned above, the spectrum information received by the apparatuses described herein may be collected by one or more aggregators. For example, a wireless network may be configured so that at least some of the wireless radios in the system gather and transmit spectrum information. This spectrum information preferably includes both frequency information as well as geographic and temporal information. This information may be collected or aggregated, for example, by a remote processor (e.g., a remote server) which may include a spectrum analysis engine that is configured to aggregate the information. For example, the remote processor may generate a geo-spectrum database (GSDB) that includes the aggregated information.

Thus, contemplated herein are networks in which multiple wireless radios in the network monitor (e.g., continuously) all or a portion of one or more operating bands in parallel with ('normal') operation as a wireless RF radio receiving and transmitting wireless information in a portion of the operating band (e.g., the channel). A networked system that monitors the RF spectrum at various remote locations using wireless RF devices may be adapted for monitoring, without disrupting the network operation. For example, a network may include endpoint wireless receivers (e.g., customer provided/purchased equipment or CPEs) and/or wireless access points (Aps) that each monitor the band using a secondary receiver that is configured to operate in parallel with a primary wireless radio receiver, and monitory the frequency spectrum of the communication band without interfering with the operation of the primary receiver/transceiver and/or transmitter for the device. Thus, the frequency information collected by the network may be network-wide and not just limited to spectrum information at the base-station.

This information may be used to create a geospatial spectral usage database that includes historic frequency information, per time-span and per geographic location. This information may generally be monitoring and/or used remotely (e.g., on the cloud). Information such as spectrum usage information may be collected, stored and analyzed, and this information may have a relatively fine granularity (e.g., kHz), and may include, for example, frequency, power, duty-cycle, etc. as well as GPS-location and antenna information (e.g., directionality, gain, etc.) about the receiver. The angle where the antenna is pointing may also be stored in the database and/or can be determined by using information about the GPS-Location and antenna information (such as directionality, gain, etc.) of peer devices.

An analysis of this geospatial spectral usage database may be performed for a variety of uses, and the analysis may be made from historical data or in real-time. For example, this enriched spectrum information (e.g., enriched with geographic/directional and temporal information) may be used to deterring a best frequency of operation for a specific network for communication between an AP and one or more CPEs (e.g., AP to CPE and CPE to AP directions). This determination may be time-based, based on the per-day/time spectrum usage information discovered. For example, a network (individual components of the network) may be configured to dynamically change frequency at specific times based on this information. Thus, if an analysis of this data shows that a particular region of the network experiences more crowding of a frequency spectrum at a particular time of day, then the network may regulate operation of these regions to alleviate/avoid problems. In another example, a system may dynamically change frequency upon detecting interference/blocking signal, as illustrated below. This may be done based on an analysis of a larger database, or based only on locally collected frequency spectrum information.

In another example, the network and/or devices (APs and/or CPEs) may switch to more robust coding schemes that combat that specific interference as evaluated by the engine. Additionally or alternatively, the network and/or devices may change sub-carrier symbol mapping, etc., based on an analysis of the spectrum.

During installation of a wireless radio device that operates within the operational band covered by the database (e.g., the GSDB), this information may be used to more effectively work with the various nodes of the network, including for alignment, and/or for use with an alignment tool. A spectrum analysis engine could use the GSDB to recommend ways to set-up a network so that it will run most effectively, including alignment.

Although many of the device variations described herein including two receivers acting in parallel, the database of enriched frequency information may be constructed using devices that do not include a separate primary and secondary receiver. For example, a device (e.g., AP or station) may have a single receiver that operates as both the primary receiver for transmission of wireless data and for monitoring the frequency spectrum. For example, a single receiver may switch between modes (e.g., monitoring frequency spectrum and receiving wireless data). Such an embodiment may be used in particular when switching between modes could be performed relatively quickly (e.g., faster than 5 ms). Similarly, a network may include one or more nodes that only include frequency spectrum monitoring devices (receivers). In some variations the devices may include a virtual wireless radio, which may have both a filter (for receiving wireless data at frequencies within the band) and spectrum analyzer (for monitoring frequency spectrum information of the entire operational band.

Point-to-Point Alignment

Also described herein are point-to-point alignment systems. Any of these systems may be used as part of the wireless radio systems described herein. Point-to-point alignment methods and apparatuses (devices and systems) may generally include ways to optimization communication between a first wireless radio (e.g., an AP) and a second wireless radio (e.g., a station).

The methods, devices and systems for point-to-point alignment may include the use of an alignment tool which may a hand-held tool, or it may be integrated into a wireless antenna device, or it may be remotely located (e.g., on a remote server) and accessed by a local device (e.g., including by the wireless antenna). In some variations the point-to-point alignment tool is an application (which may include one or more of software, hardware or firmware) that runs on a handheld computer such as a smartphone or other mobile computing device. The methods and apparatuses described herein may be local to the antenna being aligned, or they may include the use of remotely located components, including a remote processor (e.g., server) that performs at least some of the steps described herein, including determining the direction between the two antennas being aligned.

The point-to-point alignment tools and methods described herein may be used with any of the methods and apparatuses described herein, including the dual-receiver apparatuses and the geospectrum databases (GSDB) described above, and may incorporate use of the enriched frequency spectrum information. For example, the point-to-point alignment methods and apparatuses may adjust the alignment based on optimizing information calculated from the GSDB (e.g., by a spectrum analysis engine); in some variations antenna alignment, or point-to-point alignment may include adjusting or modifying the operational parameters of one or both antennas, such as the transmission/reception channel(s), the modulation type and/or scheduling, etc.

In general, the point-to-point alignment apparatuses and methods described herein may be used in a cloud environment (e.g., as part of a remote and/or distributed server), both using info from the cloud to facilitate alignment and synchronization between antennae, and in feeding information to cloud receive feedback regarding a "slave" antenna and/or the local environment.

The methods and apparatuses for point-to-point operation described herein typically include methods and devices for point-to-point alignment of wireless radio devices using an alignment tool having a compass. The compass may be read by the alignment tool, and may be part of or locally positioned relative to the device being installed (e.g., aligned). The device being installed is typically positioned remotely relative to the other wireless radio device with witch it is being aligned. As used herein "local" refers to the immediate vicinity of the article being references; for example, the compass may be local relative to the antenna being aligned and may be located on (or as part of) the antenna or as part of a tool (e.g., alignment tool) that can be positioned near (within a few feet, within 10 feet, within 20 feet, within 100 feet, etc.) the antenna. In some variations the alignment tool is local to the antenna when it is within a few feet of the antenna or a stand/holder for the antenna (e.g., tower), including when it is on or immediately adjacent to the antenna). The term "remote" or "remotely" may refer to an article that is located some distance (e.g., more than a few feet, more than a few hundred feet, more than a few miles, etc.) from the referenced article. For example, the antenna to which the local antenna is being aligned with may be more than a few feet (more than 20 feet, more than 100 feet, more than 500 feet, more than a mile, etc.) from the other antenna.

In general, a method for point-to-point alignment of a wireless radio device using an alignment tool may include determining a location of the first wireless radio device that is remotely located relative to the alignment tool, determining the location of the second wireless radio device that is local to the alignment tool, using the compass of the alignment tool and the locations of the first and second wireless radio devices to determine a direction to point the second wireless radio device; and displaying, with the alignment tool, an indicator of the direction.

In general, the locations of the two antennas may be determined from global positioning satellite (GPS) information. GPS information may provide position information, and allows for GPS Clock Synchronization. The GPS information may be provided by the antenna(s), which may include GPS positioning capability, including hardware and/or software for determining GPS positions. The position information may therefore be read from the antennas themselves, and/or from a remote server(s) that has received this information. In some variation the position of the local antenna is determined by GPS from a separate handheld device, such as the alignment tool or a smartphone configured as an alignment tool, where the alignment tool is positioned next to or near the antenna and the position of the antenna is inferred from proximity to the position (GPS position) of the alignment tool.

In general the compass provides directional information. The directional information may be provided relative to magnetic north, for example. The compass may be part of the antenna and/or the alignment tool or both. In general, the compass is electronically readable, so that direction can be sensed by the alignment tool. In addition to the compass, the alignment tool may have access to one or more of a gyroscope, accelerometer and/or orientation sensor, which may provide orientation information for fine tuning X-axis and Y-axis of the antenna, as described in greater detail below. The alignment tool may include all or some of these precision alignment components, which can be built into the antenna (as part of a dedicated alignment tool), or a separate detachable/reusable tool, such as a box can be provided during installation. As mentioned above, the alignment tool may be downloadable application ('app') for configuring and controlling a mobile telecommunications device such as a smartphone; the device (e.g., smartphone) may include an on-bard compass and/or gyroscope, accelerometer, orientation sensor or the like.

In variations including fine tuning sensors (e.g., gyroscope, accelerometer and/or orientation sensor), the tool may be connected or connectable to the antenna, antenna mount or antenna holder.

The alignment methods and tools described herein are an improvement over currently available methods and systems for point-to-point aligning of antennas. For example, without an alignment tool, an antenna orientation and position is typically manually and iteratively adjusted by attempting to first make a link, then manually aligning the link to improve signal strength by comparing received transmission strengths between the two antennas, which may be time consuming and difficult, particularly for antennas separated by any significant distance. Although an antenna mount may be configured for fine tuning the X-axis (as well as the Y-axis) to help installers better align and perform point to point (PTP) antennae deployment, this doesn't solve the problem of having to go through an iterative process to align PTP links, but instead may only provide limited help in dealing with alignment challenges. Installers may spend several hours just to align a link and not be certain whether it is optimized or not.

The systems, devices and methods (including in particular the alignment tools and methods of using them) described herein may allow an installer to establish the link and adjust the alignment in seconds (with confidence alignment is optimized), in contrast to the much longer alignment process currently required. This functionality/feature can be included in the hardware, software and/or firmware of the antenna, or be included in a cloud-based device management program.

Figure 2:
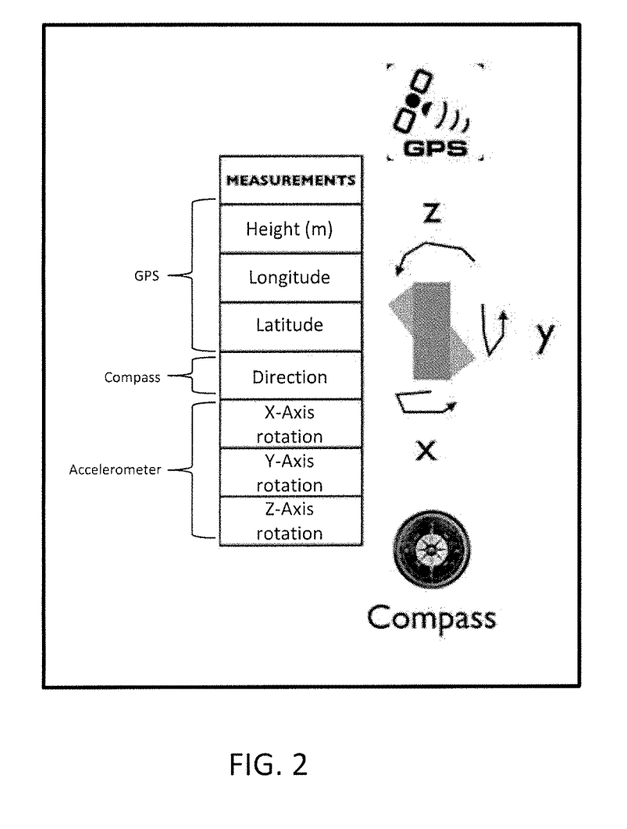
FIG. 2 is a schematic illustration of an alignment tool for point-to-point alignment.

In one variation, precision dedicated hardware with GPS, compass, and/or one or more orientation sensor(s) may be used as an alignment tool to assist with alignment. FIG. 2 schematically illustrates one variation of an alignment tool. In this example, the alignment tool is configured as a small device (e.g., "box") that can sit on or connect to any antenna (e.g., a dish antenna). The antenna or mount may include mounting bracket for the device. In this example, the device includes a GPS input, which receives GPS information on the position of the antenna and/or the tool, including height, longitude and latitude. The tool also includes an input for compass information, including direction (e.g., 0.0 to 359.9 degrees, etc.). Finally, and optionally, the tool may also include an input for one or more accelerometers, including tri-axial accelerometers, including x-axis rotation, y-axis rotation, and z-axis rotation. In addition, the tool may include an input for position (e.g., GPS position) of the remote antenna that the local antenna is attempting to link (point-to-point) with, as well as (in some variations) an indicator of the direction that the remote antenna is pointing. In some variations, as described below, the tool may also include an indicator of the link quality (e.g., power).

At a minimum, the tool may include an input for GPS position of the local antenna, the remote antenna and the local compass heading. From this information, (e.g., for both sides of a link), the tool may be able to tell each side of the link how to be adjusted to optimize the connection. Alternatively, if the directional (compass) information and/or rotational information (e.g., accelerometer information) is available for only one antenna of the paired antennas, as well as the distance information, the alignment of the local antenna may be completed with little if any iterative aiming processes and doubt as to the quality of the alignment. In some variations the alignment tool may include near-field communication (e.g., Bluetooth) or be connected via IR or hardwired (USB etc.) to another device and/or to a remote device (e.g., a remote server, the cloud, etc.) and may connect a control/device management program.

Any of the alignment tools described herein may communicate with or include a display, and may also be capable to wirelessly connect to a corresponding tool on or attached to the other antenna, or may directly talk with the antenna itself to determine its location or other parameters (e.g., GSP data). In one variation, the tool of one antenna talks directly to a tool on the other antenna. In another variation, the tool is part of or otherwise communicated with the installer's cell phone to connect to the network, and may use the phone to connect through the network with the other antenna/tool. In another example, both tools and/or antenna connect to a network and talk to a central administrator located on the remote server (e.g., cloud), and the information can then displayed be in the app on the installer's cell phone. See, e.g., FIGS. 7A and 7B, described in greater detail below.

For example, the features/capability of the tool may be implemented by software in a smartphone. Optionally, an adapter or other connector may be used to fix the smartphone to the antenna to lock the relative position of the smartphone to the antenna structure.

In general, the tool may be used to instruct or guide a user (e.g., an installer) in adjusting the position/orientation of an antenna when aligning it with another antenna in a point-to-point transmission. Thus, the tool may provide visual and/or audible instructions or guidance to an installer to help initially (rough) align the local antenna and then optimize (fine positioning) the local antenna. In some variations the antenna may include one or more motors that may be controlled at least in part by the tool to automatically adjust/optimize the position of the local antenna. For example, an antenna may have a motor built into the frame and/or mount to adjust the antenna position. In one variation, only one motor is included, to adjust the Y-axis. In another variation, one motor is implemented to adjust the Y-axis, and one motor is implemented to adjust the X-axis. In, yet another variation, three motors are implemented to adjust the X, Y and Z axis. Auto-adjustment through real-time feedback may be used for initial set-up. After the device is aligned, the antenna is locked into position. In another variation, the antenna may continue to correct its alignment when the system detects miss-alignment.

Figure 3:
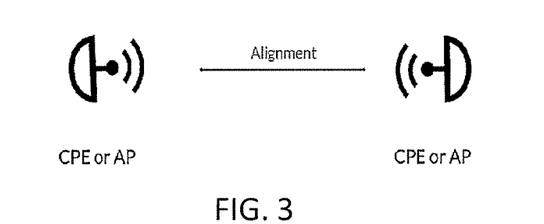
FIG. 3 is an example of generic point-to-point alignment that may be performed or assisted with an alignment tool.

An example of alignment generic alignment is shown in FIG. 3. In this example, two antennas are being aligned for point-to-point transmission and the signal strength is optimized between the two devices. The first antenna (e.g., local device) on the left may be an AP or CPE (station), while the second antenna (e.g., remote device) on the right may be a CPE or AP.

Figure 6A:
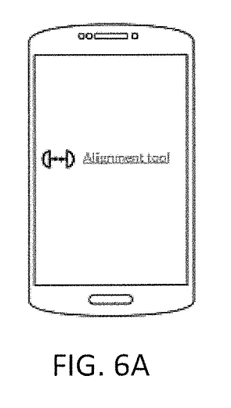
FIGS. 6A-6F illustrate one method of operating an alignment tool for point-to-point alignment of a local and remote device.
Figure 6B:
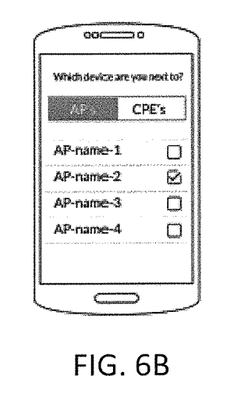

FIGS. 15-6B illustrate one variation of an alignment too configured as a mobile wireless alignment tool. One challenge with installing outdoor wireless equipment at long ranges is the equipment is usually very directive (focused) and must be precisely aligned so the radios on both ends of the link are aimed directly at each other. As mentioned above, the systems and devices described herein are not limited to outdoor devices.

Typically, the better the quality of alignment, the higher the signal levels of the wireless link are. Thus, when installing the wireless devices/antennas, the installer may align the devices on each side so the link has the highest signal level possible. An alignment tool configured as executable instructions (code) stored in a non-transitory computer-readable storage medium that controls a processor may be implemented as an application (e.g., downloadable software) that can be operated a smart phone may be particularly useful for this purpose. For example, a mobile alignment tool may be configured as executable instructions that run on a smartphone. The smartphone may include one or more sensors that provide directional information and may be operated as a compass. The sensor(s) providing directional information may be referred to as a compass. Any of the mobile devices (including smartphone variations) described herein may include a built-in compass for automatic bearing calculation.

In general, point-to-point alignment may be performed in steps using the alignment tool. For example, a first step for aligning a wireless device/antenna may include calculating the direction the device (wireless device) must be pointed for alignment. In general, this calculation may be performed by the device, with the user providing sufficient input to determine the locations of the local and remote devices. For example, a user may input the location of the remote device, or a reference that indicates where this location information may be found. The location of the local device, or a reference to where the location may be found, may also be input by a user, or the location of the local device may be deduced from the location of the alignment tool, which may be automatically determined based on, for example, a GPS signal to/from the tool.

The initial alignment of the two (remote and local) devices may be referred to as rough alignment. If a device is connecting to a device many miles away, it may be difficult to establish an initial (rough) connection between the two devices. An installer may manually use the GPS coordinates of the remote device, the GPS coordinates of local device, manually calculate bearings between the coordinates, and use a compass on site to establish a general direction to aim the device. The alignment tools described herein may simplify this and provide more accurate and faster alignment by providing an easy to understand directional indicator (e.g., arrow, pointer, etc.) without requiring that the user do any calculations.

In some variations the alignment tool may already have the GPS coordinates of the remote radio device that is being connected with the local device. The tool may automatically retrieve or have a list (e.g., look-up table) of the GPS coordinates of the remote device. The GPS coordinates of the local device may be retrieved directly from a GPS chip on mobile device (unless already stored) or from the local device. Based on the local and remote GPS coordinates, and using a built-in compass (or sensor(s) configured as a compass), the alignment tool can determine which direction the local device should be pointed to align with the remote device.

For example, in a mobile application downloaded onto a handheld device (e.g., smartphone), the handheld device may be configured by the application to automatically show an arrow pointing to the direction in which the local device should be oriented.

Figure 4:
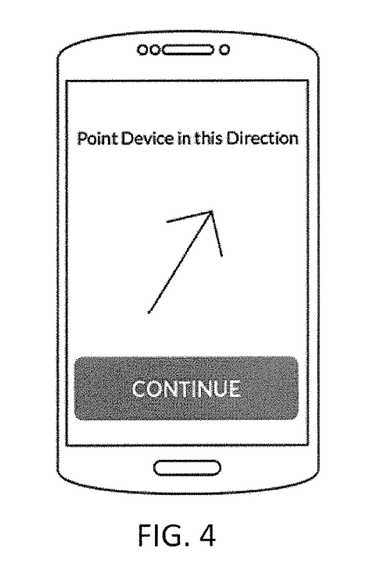
FIG. 4 illustrates an alignment tool configured as an app running on a smartphone that providing an initial (rough) alignment guide.

FIG. 4 illustrates one variation of a handheld device configured to display an arrow indicating the direction for rough alignment of a local wireless radio device when aligning with a remote device.

Once the device has been roughly aligned, which may be confirmed by the alignment tool, the alignment tool may also be used to guide fine tuning/optimization of the alignment. Fine tuning of the direction of the device/antenna to ensure the most accurate alignment may be performed to provide the highest quality signal/link possible. In some variations the alignment tool may be connected to the local device physically, and a signal value read from the device to indicate signal strength between the two devices. As mentioned above, the connection to the local device may be a direct physical connection (e.g., cable, wire, etc.) a wireless connection (Bluetooth, IR, etc. that may be made between the tool and one of the devices being aligned) or a connection through a network (e.g., a wireless network, including one of the devices being aligned). For example, following the rough alignment described above, the local wireless radio device may already be connected to the remote device and thus the network (including the cloud). If the tool is configured as a mobile app, for example, an installer can retrieve signal level updates from a remote server (e.g., cloud) in very quick increments, without needing to connect directly to the device.

Typically when designing a new link, or before installing/aligning a new radio/antenna, an installer may collect the RF properties of the devices/antennas on both sides of the link, collect device GPS coordinates or distance, and run calculations to determine how well the link will perform and what signal level to expect. Any of the alignment tools described herein may perform these functions. In addition, the alignment tools and methods described herein may also use the geo-spectrum database information (e.g., the enriched frequency spectrum data) to determine how well this link will perform and to optimize the connection or suggest position and/or alignment information.

For example, a mobile handheld alignment tool may have the GPS coordinates of the remote device to be connected to. The mobile too (application) may also determine the GPS coordinates of the local device. Based on the two GPS coordinates, and the RF properties (e.g., frequency, transmit power, antenna gain) of the new local device, the tool may determine what an optimal (e.g., "ideal") signal level should be at this distance. For example, the tool may use a Free Space Loss calculation to determine an ideal signal level between the remote and local devices based on the distance and the known (e.g., provided by the software or a remote server based on, for example, the make/model of the devices) properties of the remote and local devices.

Figure 5A:
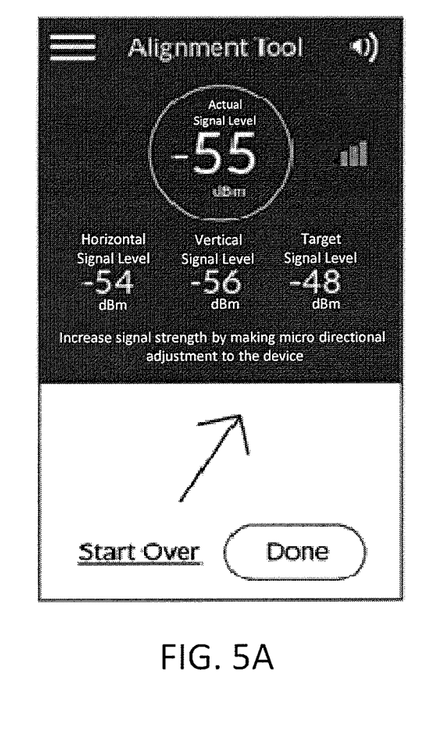
FIGS. 5A and 5B illustrate an alignment tool causing the display of information for fine alignment of a local wireless radio device.
Figure 5B:
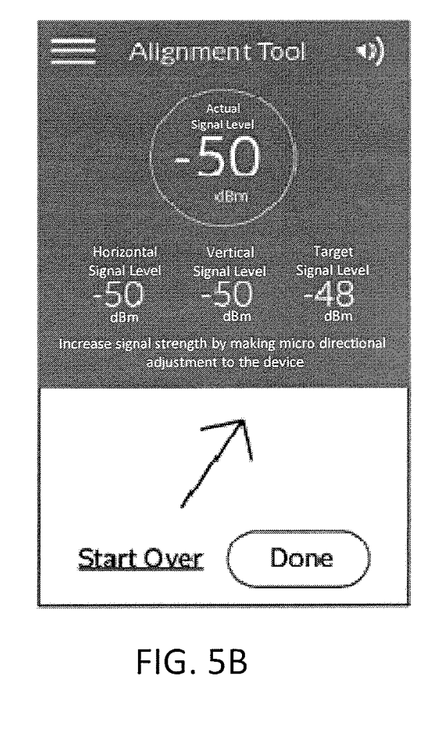

The alignment tool may use this target (or ideal) signal level as a guideline for the installer to use when aligning. For example, the tool may display this target signal level (e.g., on the screen of the device in the mobile application), and provide it as a guideline for how well the device is aligned. If actual signal is close to or equal the target signal, the device alignment may be complete. For example, FIGS. 5A and 5B illustrate variations of displays that may be used for fine adjustment/aligning of the local device. In FIG. 5A, the alignment tool is displaying (e.g., on a hand-held device such as a smartphone) the actual signal level (in dBm), and may include both the horizontal and vertical signal levels, as well as the target ("ideal") signal level. As the local device is adjusted (e.g., by adjusting the angle, tilt, etc.) the tool may update the display, as shown in FIG. 5B, and may provide a color indicator (e.g., green, etc.) that the alignment is "good" or close to optimal (e.g., when the signal strength is within 10%, 5%, 3%, etc. of the ideal signal strength). The display may also show a graphical indicator of the signal strength (e.g., bars, etc.).

FIGS. 6A-6F illustrate one method for point-to-point alignment as described above. Any of these steps may be omitted or repeated, and alternative and additional steps (not shown) may also be included. For example, in FIG. 6A, the alignment tool may be initialized. For example, the alignment tool may be accessed from a menu of applications (e.g., on a mobile device, computer, etc.) near the antenna to be aligned. In FIG. 6A, a graphic illustrating the alignment tool has been accessed is displayed on the screen of a handheld device (e.g., smartphone). The identity of the local ("first deice") being aligned is then entered by the user. In some variations this step may be automated or simplified. For example, the tool may automatically detect and/or connect the local device. In some variations the alignment tool may be a dedicated alignment tool that is part of the local device and may already have this information, thus this step may be skipped. In some variations the alignment tool may ask for confirmation that the entered or automatically detected device is correct.

In FIG. 6B, the alignment tool provides a menu/list of devices (AP devices and/or CPE devices) that are nearby and asks the user to confirm which devices is the local device to be aligned.

Figure 6C:
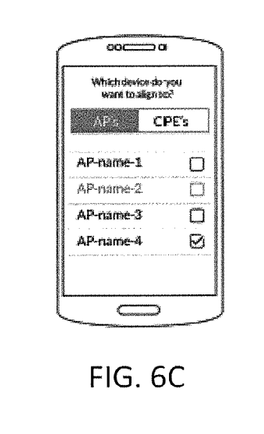
Figure 6D:
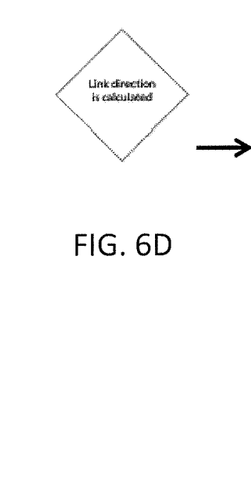

As shown in FIG. 6B, the user may enter the remote device to be aligned with the local device. As mentioned, the alignment tool may also include a list of predetermined (e.g., automatically detected) remote (though geographically nearby) devices from which a user may select. In FIG. 6C, a menu of such remote devices is provided. Based on the devices selected, in FIGS. 6A-6F, the alignment tool may automatically determine the properties of the local and remote devices, including the locations (GPS locations) of these devices. Alternatively, any of these properties (location, operational characteristics, etc.) may be manually entered or verified using the tool. Once the first (e.g., local) and second (e.g., remote) wireless radio devices have been selected, the tool may determine a directional link between the two, as shown schematically in FIG. 6D. The calculation may use the locations (e.g., GPS locations) of the local and remote devices, as well as any additional information (e.g., from the frequency spectrum information/database) and may use the compass accessed by the alignment tool to calculate a directional indicator (e.g., arrow).

Figure 6E:
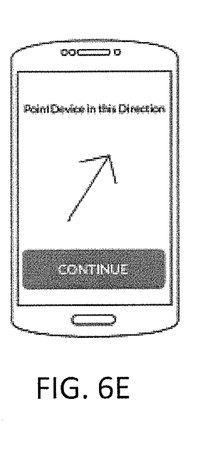

As already shown in FIG. 4, the alignment tool may then provide a general/rough alignment indicator (e.g., arrow) on the screen to guide the initial alignment of the two devices. In FIG. 6E (and FIG. 4) the arrow indicates the direction to point the local device for general alignment with the remote device. This initial alignment may be sufficient to allow fine tuning of the alignment. The directional indicator may be continuously updated (e.g., keeping the arrow oriented towards the remote device, relative to the local device).

Figure 6F:
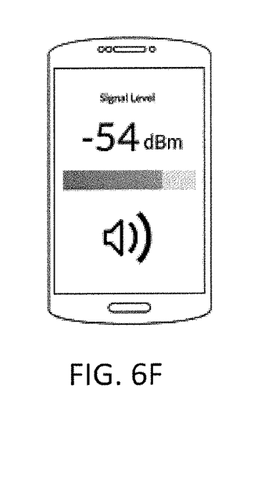

FIG. 6F illustrates one variation of using an alignment tool for fine tuning of the alignment. As shown in FIG. 6F (and described above in FIGS. 5A-5B), the tool may cause a display of the actual current signal level between the local and remote devices. In FIG. 6F the display includes a bar showing relative strength of the signal level as well as an icon. A more detailed display, such as that shown in FIGS. 5A-5B may also/alternatively be used. The installer may then optimize the signal strength using the displayed signal strength as a guide. For example, the installer manually (or automatically) adjusts one or more of X-rotation, Y-rotation, Z-rotation, etc.

As mentioned above, FIG. 7A illustrates alignment of a pair of point-to-point devices (e.g., antennas) using an alignment tool as described. For example, in FIG. 7A, a local radio device/antenna 1809 is shown positioned on a tower/pole or the like, and is intended to be aligned with a remote device (e.g., radio/antenna) 1811, also shown mounted. In this example, the alignment tool 1807, which may be a device having a hand-held processor (such as a smartphone having a set of instructions for controlling the device to operate as an alignment tool) is located locally (e.g., within 10 feet) of the local device to be aligned 1809. The alignment tool includes a screen/display and also includes a compass input/function. In operation, the alignment tool receives information allowing it to determine the geographic location of the local 1809 and remote 1811 devices. For example, the alignment tool may receive the actual GPS locations of the remote 1811 device and either the GPS location of the local 1809 device or its own GPS location.

Figure 7A:
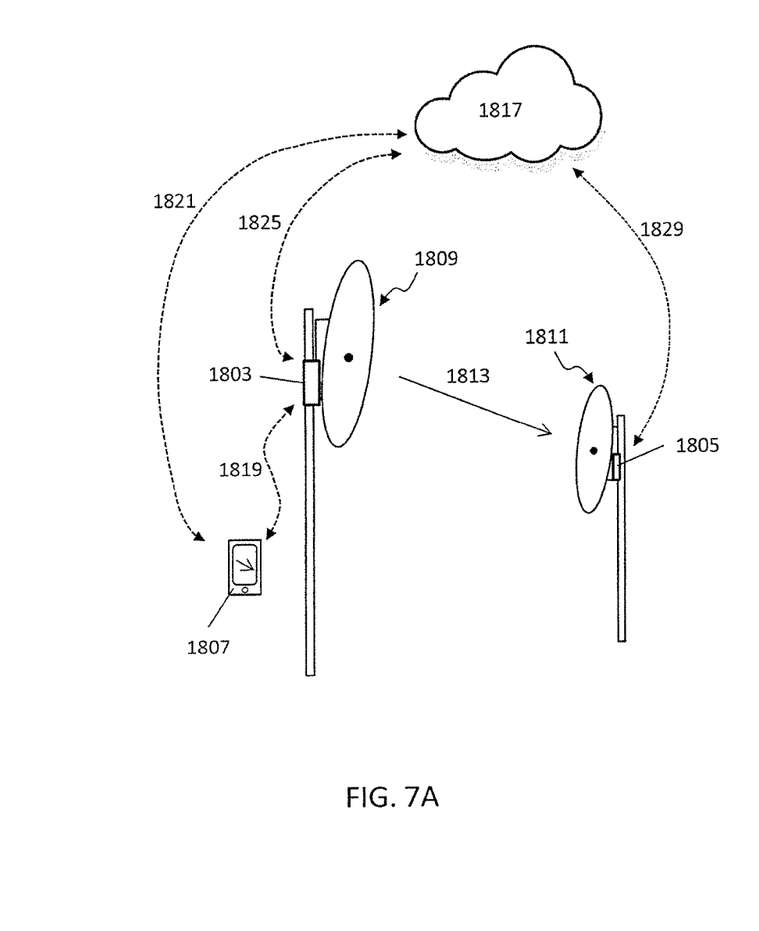
FIGS. 7A and 7B illustrate alignment of a pair of devices using variations of the alignment devices described herein.

In some variations the alignment tool communicates directly 1819 with the local device 1809, for example via wired connection or wireless connection (e.g., Bluetooth). The device may then receive information directly from the local device about the GPS location and/or the signal quality of any link between the remote device 1811 and the local device 1809. The local device may communicate directly with the remote device (e.g., through a robust link) and/or may communicate with a remote server 1817 (e.g., via an Ethernet connection 1825 and/or communication through the remote device 1811). Alternatively, the alignment tool may communicate directly with a remote server 1817 (via an internet connection) to receive information about either or both the local 1809 and remote 1844 devices being aligned. In some variations the remote device 1811 communicates directly with the alignment tool (not shown), e.g., via wireless signal.

In FIG. 7A, the local 1809 and remote 1811 devices can initially be roughly aligned 1813 using the alignment tool, which accesses the compass to show which direction (e.g., azimuthal direction) to point the local device. The alignment tool may also receive information about the signal strength (e.g., signal strength received by the local device and/or received by the remote device), which may be used to further align the device, as discussed above in FIGS. 6A-6F.

Figure 7B:
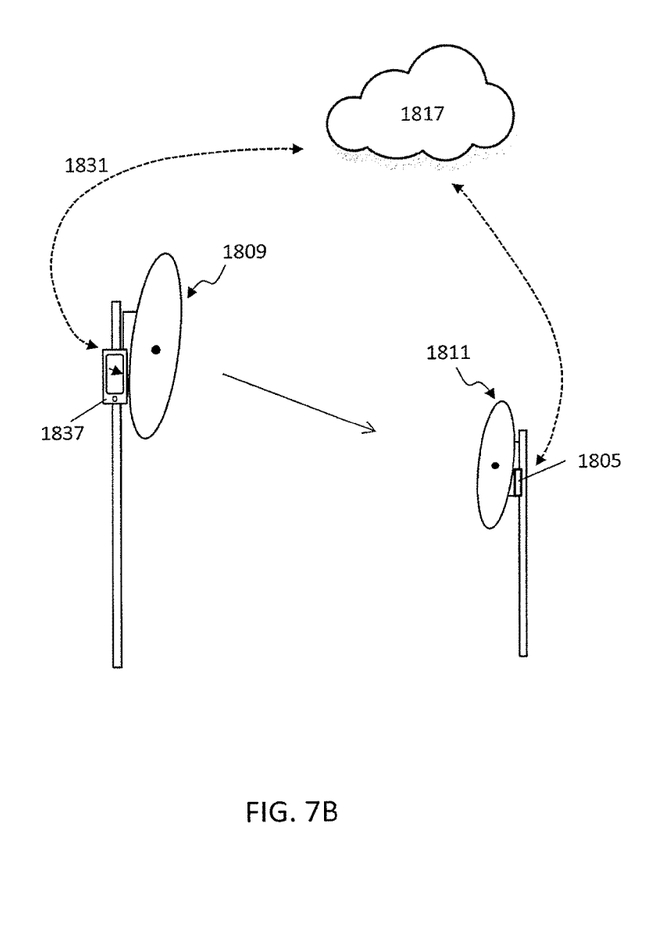

Another alternative is shown in FIG. 7B, in which the alignment tool 1837 is coupled with or integrated into the local device 1809, as described in greater detail below. In some variations a separate alignment tool 1805 may also be associated with the remote device 1811. In FIG. 7B, the alignment tool may communicate directly with the local device 1809 (e.g., direct wired, e.g. USB, connection or by wireless connection) and/or may communicate through a remote server (e.g., cloud 1817). Similarly, the alignment tool may communicate 1831 with the remote device 1811 either directly (via a wireless connection) or through a remote server (e.g., cloud 1817). As before the tool may provide alignment information, including the geographic indicator (which directly to grossly aim the local device to align with the remote device), and may also provide additional information on finely aligning the two devices, e.g., by showing a dynamic display of the signal intensity between the two devices and in some variations a target signal intensity (which may be normalized to an "alignment" metric showing percent aligned, or relative alignment, etc.). This display is dynamic because it may quickly update the alignment as either the local or remote devices are moved. In some variations additional alignment information may be provided by the remote processor (e.g., cloud-based processor) to guide alignment. For example, the remote processor may calculate the target signal strength and determine actual signal strengths and/or suggest way to improve alignment.

Figure 8:
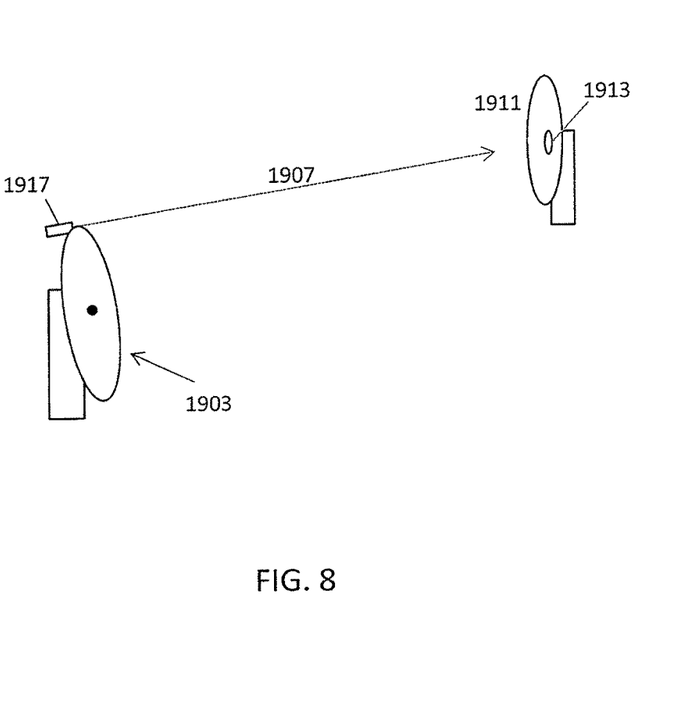
FIG. 8 shows another variation of an alignment device, using an optical alignment aid (e.g., laser).

Other alignment tools may be used separately or in addition to those described above. For example, an optical alignment tool may be included in addition or alternatively to the geographic alignment tool. In some variations the alignment tool includes a laser (e.g., laser sight) that operates between the local and remote devices being aligned. For example, FIG. 8 illustrates a local device 1903 that can be aligned with a remote device 1911 using, at least in part, a laser (optical) signal from the remote to the local (or the local to the remote, as shown in FIG. 8). In this example, the local device 1903 includes an alignment tool 1917 having a laser that can be directed by the local user toward a remote device 1911. The beam of the laser 1907 may be directed to a sensor 1913 on the remote device 1911. Further alignment accuracy may be achieved by including as part of the sensor a depth (e.g., an opening, hole, channel, etc.) with a sensor or sensors along the depth, including near or at the bottom; the deeper the beam can penetrate, the more accurate the visual alignment is likely to be. Additional sensors may be placed on the outside of the opening. Although optical sensing is not completely analogous to electromagnetic sensing, and may have a limited range, it may provide at least initial (rough) alignment. Any of the alignment tools described herein may include a laser/optical alignment component. Further, a laser alignment tool, which uses both a remote (or local) laser and a local (or remote) target, may be adapted to communicate with any of the alignment tools described herein.

As mentioned above, any of the alignment tools described herein may engage with an antenna in a fixed orientation, so that the alignment tool is held in a fixed orientation relative to the dish of the antenna. This may be achieved by include a mount on either or both of the alignment tool and the antenna so that the alignment tool can fixedly engage with the dish/reflector of the antenna. For example, the alignment tool and/or the antenna may include a mount having a track, guide, rail, snap, or other attachment that holds the alignment tool in a fixed position relative to the antenna during the alignment procedure.

Figure 9:
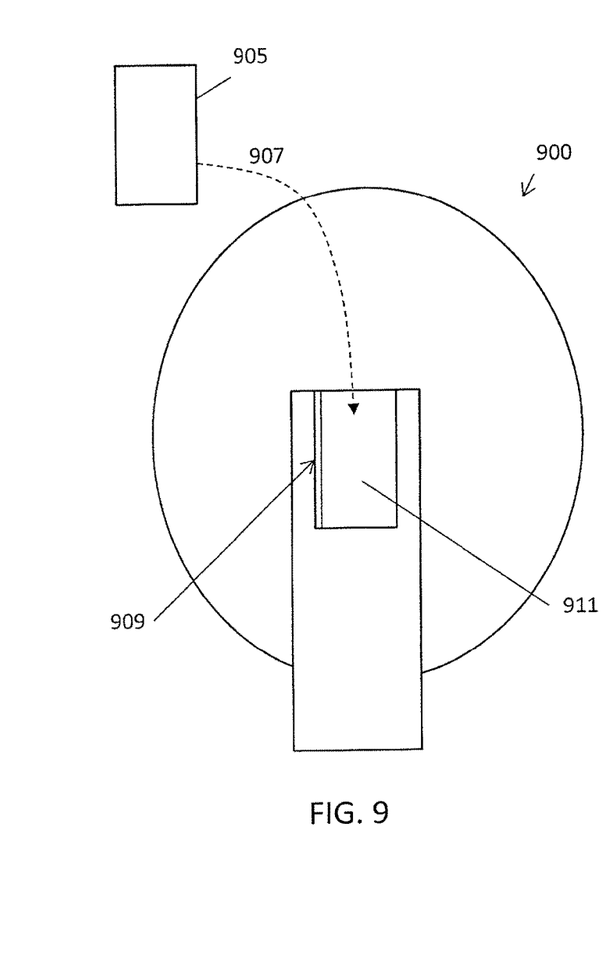
FIG. 9 schematically illustrates a back portion of an antenna including a fixed-orientation coupling region for an alignment tool.

For example, FIG. 9 illustrates one variation of an alignment tool 905 that is configured to fixedly engage with an antenna 900 so that the alignment tool is held to the antenna and moves with the antenna (e.g., while aligning the antenna). In this example, the alignment tool includes a rim, ridge, edge, pin, or the like that engages with a mating surface, track, guide, channel, etc., 909 in a pocket, holding region, mount, etc. of the antenna 900. For example, a mount 911 may include a recessed region in the housing of the antenna into which the alignment tool (or a smartphone controlled by alignment tool logic) may fit and be securely held. Any appropriate mount may be used. In some variations, the mount may be a screw, fastener, bolt, snap, etc. that secures the alignment tool in a fixed orientation relative to the antenna. The antenna may have a receiving component (hole, channel, opening, etc.) for receiving the mount of the alignment tool, or it may not. For example, in some variations the alignment tool may fasten to any portion of the antenna, e.g., may include a clamp, or any other fastener that allows it to mount to an edge or surface of an antenna.

Terminology used herein is for the purpose of describing particular embodiments only and is not intended to be limiting of the invention. For example, as used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof. As used herein, the term "and/or" includes any and all combinations of one or more of the associated listed items and may be abbreviated as "/".

Spatially relative terms, such as "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly. Similarly, the terms "upwardly", "downwardly", "vertical", "horizontal" and the like are used herein for the purpose of explanation only unless specifically indicated otherwise.

Although the terms "first" and "second" may be used herein to describe various features/elements, these features/elements should not be limited by these terms, unless the context indicates otherwise. These terms may be used to distinguish one feature/element from another feature/element. Thus, a first feature/element discussed below could be termed a second feature/element, and similarly, a second feature/element discussed below could be termed a first feature/element without departing from the teachings of the present invention. As already discussed above, in any of these variations the alignment tool(s) may be permanently (rather than removably as just described) integrated into the antenna.

As used herein in the specification and claims, including as used in the examples and unless otherwise expressly specified, all numbers may be read as if prefaced by the word "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc. Any numerical range recited herein is intended to include all sub-ranges subsumed therein. Per M.P.E.P. § 2173.05(b), one of ordinary skill in the art would know what is meant by "substantially equal". For example, the phrase "substantially equal" or "substantially the same" in a statement such as "a fourth RF signal having substantially the same carrier frequency as a first RF signal" may mean a radio receiver that receives either RF signal may operate in an equivalent manner.

Although various illustrative embodiments are described above, any of a number of changes may be made to various embodiments without departing from the scope of the invention as described by the claims. For example, the order in which various described method steps are performed may often be changed in alternative embodiments, and in other alternative embodiments one or more method steps may be skipped altogether. Optional features of various device and system embodiments may be included in some embodiments and not in others. Therefore, the foregoing description is provided primarily for exemplary purposes and should not be interpreted to limit the scope of the invention as it is set forth in the claims.

The examples and illustrations included herein show, by way of illustration and not of limitation, specific embodiments in which the subject matter may be practiced. As mentioned, other embodiments may be utilized and derived there from, such that structural and logical substitutions and changes may be made without departing from the scope of this disclosure. Such embodiments of the inventive subject matter may be referred to herein individually or collectively by the term "invention" merely for convenience and without intending to voluntarily limit the scope of this application to any single invention or inventive concept, if more than one is, in fact, disclosed. Thus, although specific embodiments have been illustrated and described herein, any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A method for point-to-point alignment of wireless radio devices using an alignment tool having a compass, the method comprising:
   determining a location of a first wireless radio device that is remotely located relative to the alignment tool;
   determining a location of a second wireless radio device that is local to the alignment tool;
   using the compass of the alignment tool and the locations of the first and second wireless radio devices to determine a direction to point the second wireless radio device; and
   displaying, on the alignment tool, an indicator of the direction.

2. The method of claim 1, further comprising mounting the alignment tool onto the second radio device.

3. The method of claim 1, wherein determining the location of the first wireless radio device comprises entering the identity of the first wireless radio device into the alignment tool.

4. The method of claim 1, wherein determining the location of the first wireless radio device comprises entering the identity of the first wireless radio device into the alignment tool and receiving GPS information indicating the location of the first wireless radio device.

5. The method of claim 1, wherein determining the location of the first wireless radio device comprises wirelessly receiving, in the alignment tool, a GPS indication of the location of the first wireless radio device.

6. The method of claim 1, wherein determining the location of the second wireless radio device comprises determining the location of the alignment tool.

7. The method of claim 1, wherein determining the location of the second wireless radio device comprises receiving a GPS indication of the location of the second wireless radio device.

8. The method of claim 1, further comprising finely tuning the direction of the second radio device.

9. The method of claim 1, further comprising displaying with the alignment tool, an indicator of the measured signal strength between the first and second radio devices.

10. The method of claim 1, further comprising:
calculating an estimate of optimal signal strength between the first and second wireless radio devices; and
displaying on the alignment tool an indicator of the optimal signal strength between the first and second wireless radio devices.

11. The method of claim 1, further comprising:
calculating an estimate of optimal signal strength between the first and second wireless radio devices; and
displaying on the alignment tool an indicator of how optimal the signal strength between the first and second wireless radio devices is.

12. The method of claim 1, further comprising activating the alignment tool, wherein the alignment tool comprises a module attached to the second wireless radio device.

13. A method for point-to-point alignment of wireless radio devices using an alignment tool having a compass, the method comprising:
entering an identity of a first wireless radio device into the alignment tool, wherein the first wireless radio device is remotely located relative to the alignment tool;
determining a location of the first wireless radio device;
determining a location of a second wireless radio device that is local to the alignment tool;
calculating a direction of the first wireless radio device relative to the second wireless radio device; and
using the compass of the alignment tool to determine a direction to point the second wireless radio device so that the second wireless device is oriented towards the first wireless radio device; and
displaying, with the alignment tool, an indicator of the direction to point the second wireless radio device.

14. The method of claim 13, further comprising mounting the alignment tool onto the second radio device.

15. The method of claim 13 wherein calculating the direction of the first wireless radio device relative to the second wireless radio device comprises calculating the direction of the first wireless radio device relative to the second wireless radio device in the alignment tool.

16. The method of claim 13 wherein calculating the direction of the first wireless radio device relative to the second wireless radio device comprises calculating the direction of the first wireless radio device relative to the second wireless radio device in a remote processor and transmitting the direction to the alignment tool.

17. The method of claim 13, further comprising displaying with the alignment tool, an indicator of the measured signal strength between the first and second radio devices.

18. The method of claim 13, further comprising:
calculating an estimate of optimal signal strength between the first and second wireless radio devices; and
displaying on the alignment tool an indicator of the optimal signal strength between the first and second wireless radio devices.

19. The method of claim 13, further comprising:
calculating an estimate of optimal signal strength between the first and second wireless radio devices; and
displaying on the alignment tool an indicator of how optimal the signal strength between the first and second wireless radio devices is.

20. A method of aligning two wireless radio devices using an alignment tool, the method comprising:
rough aligning a first wireless radio device and a second wireless radio device by aiming the first wireless radio device at the second wireless radio device using an alignment tool on the first wireless radio device;
receiving an indicator of signal strength between the first and second wireless radio devices;
displaying the indicator of signal strength on the alignment tool; and
fine aligning the first wireless radio device and the second wireless radio device using the displayed indicator of signal strength on the alignment tool.

* * * * *